United States Patent [19]

Pignolet

[11] 4,184,512

[45] Jan. 22, 1980

[54] FLUID DISTRIBUTING DEVICES, PARTICULARLY FOR HYDRAULIC REMOTE CONTROL

[75] Inventor: Louis Pignolet, Lyons, France

[73] Assignee: Rexroth-Sigma, Venissieux, France

[21] Appl. No.: 856,127

[22] Filed: Nov. 30, 1977

[30] Foreign Application Priority Data

Jan. 6, 1977 [FR] France .................. 77 00255

[51] Int. Cl.² .......................................... F15B 13/08
[52] U.S. Cl. .................. 137/596; 137/116.3; 137/625.68; 137/868
[58] Field of Search .............. 137/116.3, 596, 625.68, 137/868

[56] References Cited
FOREIGN PATENT DOCUMENTS 2236101  1/1975  France ..................... 137/596

Primary Examiner—Gerald A. Michalsky
Attorney, Agent, or Firm—Feldman & Feldman

[57] ABSTRACT

A distributor comprising a pressure reducer mounted in a body and a control member, capable of modifying the calibration of the reducer, which comprises a plunger movable in a cavity, which comprises, on one side, a housing where the reducer calibrating means are placed, and, on the other side, a bore in which an active part of the plunger can be moved.

The body 3 of the distributor is formed from two parts 3a, 3b independent of each other and connected by assembly means A; these two parts are separated by a surface S passing through housing 13 connected to the low-pressure, but located in the vicinity of one end of bore 18 connected to the pressurized zone.

Application to hydraulic distributors, particularly for public works equipment.

10 Claims, 1 Drawing Figure

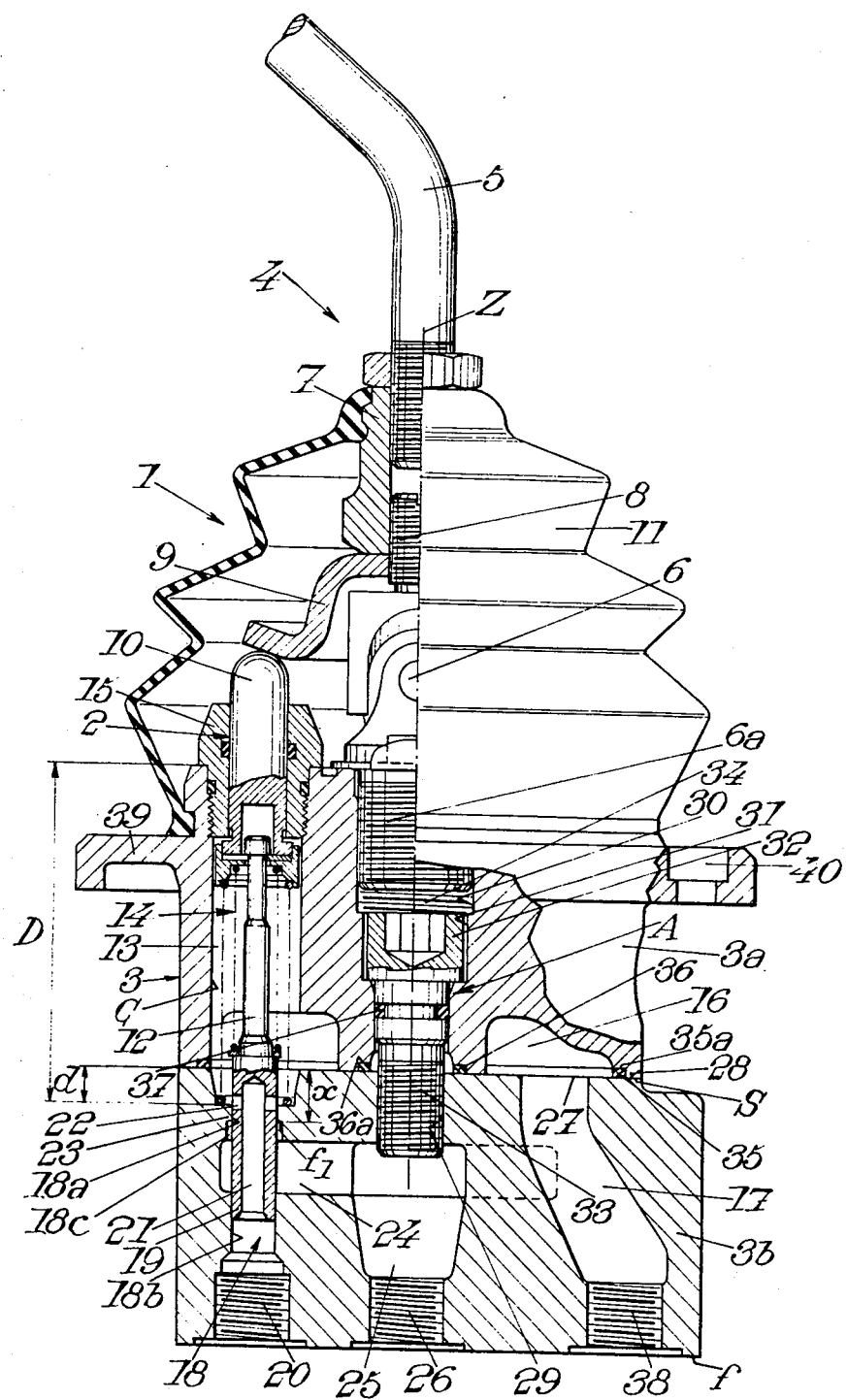

FLUID DISTRIBUTING DEVICES, PARTICULARLY FOR HYDRAULIC REMOTE CONTROL

The invention relates to improvements to fluid distributing devices, particularly for remote control, of the kind comprising at least a pressure reducer mounted in a body and a control member, such as a lever, capable of modifying the calibration of the reducer, which reducer comprises a plunger movable in a cavity of the body, this cavity comprising, on the one side, a housing where the reducer calibrating means are placed, this housing being connected to a low-pressure fluid zone and, on the other side, a bore in which an active part of the plunger may be moved, this active part controlling the pressure of the fluid at an outlet aperture situated in the axial extension of the bore, said active part comprising a blind axial hole opening into the bore on the aperture side and at least a transverse aperture provided in the vicinity of the bottom of the blind hole, to communicate this hole with the outer surface of the active part, this or these transverse holes being capable of cooperating with a shoulder of the bore, which comprises, particularly, at the shoulder, precision machined surfaces for cooperating with the plunger, the part of the cavity of the distributor body located, in relation to this shoulder, on the side opposite the outlet aperture communicating with the low-pressure fluid zone, whereas the part of the bore located, in relation to this shoulder, on the outlet aperture side comprises a groove connected to a central pressurised fluid inlet.

The invention concerns more particularly, but not exclusively, hydraulic distributing devices used particularly for public works equipment.

The invention has as its aim, especially, the provision of distributing devices which answer better than heretofore the different demands of practice, and which, particularly, may be constructed in better conditions, ensuring, on the one hand, an improved accuracy of manufacture and, on the other hand, better operating conditions.

According to the invention, a fluid distributing device of the kind defined above is characterised by the fact that the body of the distributor is formed from two parts, independent of each other, and connected by assembly means, these two parts being separated by a transversely directed surface in relation to the bore, this separation surface passing through the housing connected to the low-pressure zone and being located, in relation to said shoulder, on the side opposite the outlet aperture, said surface being, furthermore, located in the vicinity of one end of said bore so that before assembly of the two parts, access to the bore is easy, particularly for the surface machining operations of this bore.

Advantageously, the separation surface is flat and perpendicular to the axis of the bore so that the faces of the two parts of the body contacting each other along the separation surface are also flat and perpendicular to the axis of the bore.

Preferably, the part of the distributor body containing the housing connected to the low-pressure zone is constructed from a material whose mechanical characteristics are inferior to those of the material used for the part of the body comprising the bore connected to the pressurised fluid zone.

The part of the body containing the housing may be formed from a light alloy permitting high precision chill-moulding, this part could even be formed from a plastic material.

The part of the body comprising the bore connected to the pressurised fluid zone is formed from cast-iron.

Advantageously, the distributor body comprises several cavities spread out around the axis of the distributor body; a pressurised fluid inlet is provided in the part of the body comprising the bore(s), on the side of the face of this part opposite that forming the separation surface, radial chambers being provided in this part for connecting the pressure inlet to the bores; at least one tapped hole, belonging to the assembly means of the two parts, emerges, on the one hand, into the pressurised fluid chambers and, on the other hand, on to the face of this part of the body forming the separation surface in the assembled distributor; this tapped hole improves the access to the chambers provided inside said part of the body; since the moulding of the cast-iron generally takes place on cores in sand, the possibilities of complete de-sanding are improved.

Besides, the tapped hole, the assembly means comprise, on the side of the part of the body comprising the housing(s) connected to the low-pressure zone, a screw whose head is engaged in this other part of the body, this screw having a threaded part able to cooperate with said tapped hole.

Sealing joints are provided between the two parts of the body.

Advantageously, said tapped hole has its axis merging with that of the body. The part of the body comprising the housings is provided with an axial boring in the bottom of which is placed the screw intended to cooperate with the tapped hole, the head of this screw being engaged in the boring, the part of this boring, located beyond the head of the screw, being advantageously tapped so as to allow a support to be fixed for the control member of the distributing device.

Advantageously, the diameter of the active part of the plunger, and of the conjugate surfaces of the bore of the distributor body can be reduced to 6 mm, so that the control of this distributor is particularly smooth.

All the fluid inlet and outlet apertures of the distributor are advantageously regrouped on the face of the part of the body, comprising the bores, opposite the face forming the separation surface; the aperture for connecting with the low-pressure zone, also provided on this face, is connected by a channel, passing through the part comprising the bores, to the face forming the separation surface; an annular recess is provided in the part of the body comprising the housings, for connecting said housings together; this annular recess emerging on to the face forming the separation surface so that it is linked up with said passage, when the two parts are assembled.

The invention consists, apart from the arrangements outlined above, of certain other arrangements which will be explicitly discussed hereafter in connection with a particular embodiment described with reference to the accompanying drawing, but which is in no wise limiting.

The single FIGURE of this drawing shows partly in section, partly from the outside a fluid distributing device in accordance with the invention.

Referring to the drawing, there can be seen a hydraulic distributing device 1 comprising a pressure reducer 2 mounted in a body 3. Generally, several pressure reducers 2 are disposed uniformly about the axis Z of the distributor body.

A control member 4 is provided for modifying the calibration of reducer 2. This control member 4 comprises a lever 5 mounted on a ball joint 6 carried by body 3. The threaded end of lever 5 is connected by a tapped sleeve 7 to a threaded shank 8 integral with the joint. A bell-shaped cam 9 rigidly fixed to the threaded shank 8 and controlled by lever 5, can act on a push-rod 10 controlling the calibration of reducer 2. A bellows 11, made from a flexible material, particularly from an elastomeric material, connects the end of lever 5 to the upper part of body 3, so as to overlay Cam 9 and push-rod 10.

Reducer 2 comprises a plunger 12 movable into a cavity C of body 3. This cavity C comprises, on one side, a housing 13 in which the reducer calibrating means 14 are placed. Push-rod 10 can sealingly slide in a plug 15 screwed to the upper end of housing 13. The movements of push-rod 10 modify the calibration of reducer 2.

Housing 13 is connected by ducting 16,17, provided in body 3, to a low-pressure fluid zone, e.g. to an oil reservoir.

Cavity C comprises, on the other side, with respect to housing 13, a bore 18 in which an active part 19 of plunger 12 may be moved. This active part 19 operates to control the pressure of the fluid at the outlet aperture 20 located in the axial extension of bore 18.

The active part 19 has an outer shape cylindrical in revolution whose diameter is equal to that of the cylindrical inner surfaces 18a, 18b of bore 18, apart from the sliding clearance.

This part 19 comprises a blind axial hole 21 opening into bore 18 on the side of aperture 20. In the vicinity of the bottom of the blind hole 21, i.e. at the upper part in the representation of the drawing, transverse apertures 22 are provided for communicating hole 21 with the outer surface of part 19.

These holes cooperate with a shoulder 23 whose inner surface is formed by surface 18a. The part of cavity C located, with respect to this shoulder 23, on the side opposite aperture 20, freely communicates with housing 13 and the low-pressure fluid zone.

The part of bore 18 located, with respect to this shoulder 23, on the side of aperture 20 forms a groove 18c whose inner diameter is greater than that of surface 18a. Groove 18c emerges directly into a radially extending chamber 24, connected to a central pressurised fluid inlet 25.

The end transverse face $f_1$ of groove 18c forms the limit between this groove and shoulder 23, and is bordered by the lower edge of surface 18a.

This central inlet 25 is coaxial with the distributor body 3 and emerges through an aperture 26 on to face f of body 3 comprising already aperture 20; according to the mode of representation of the drawing, this is located at the lower part of body 3.

Holes 22 of plunger 12 may communicate bore 18 with the low-pressure fluid zone when plunger 12 assumes the position shown in the drawing; for this position, the lower edge of holes 22 is located above the upper edge of surface 18a and the upper part of hole 22 opens towards housing 13. When plunger 12 is driven in, holes 22 can be completely stopped by surface 18a.

If plunger 12 is further driven in, holes 22 then communicate with the pressurised fluid inlet chamber 24; this pressurised fluid is directed towards blind hole 21 and towards outlet aperture 20.

We know that the oscillations of plunger 12, subjected to the action of the calibrating means, essentially formed by a helical spring, cause at the outlet aperture, a pressure intermediate the fluid pressure arriving through the aperture and the low pressure; this intermediate pressure depends on the value of the calibration of the reducer.

The distributor body 3 is formed from two parts 3a,3b, independent of each other and connected by assembly means A; these two parts 3a,3b are separated along a separation surface S transversely directed in relation to bore 18; this surface S passes through housing 13 connected to the low-pressure zone and is located in the vicinity of one end of bore 18 connected to the pressurised zone.

As can be seen in the drawing, the distance d between surface S and the end of the part of bore 18 subjected to the pressure is reduced. This surface S is, preferably, flat and perpendicular to the axis of body 3 as well as to the axis of bore 18 parallel to the axis of the body, surface 27 of part 3a and surface 28 of part 3b coming into contact along the separation surface are also flat.

Face 28 of part 3b is located on the side opposite the surface comprising apertures 20 and 26.

Face $f_1$ of groove 18c must be located at a strict distance x in relation to face 28 of element 3b, so that overlapping between the apertures 22 and shoulder 23 is within the fixed tolerances, e.g. of the order of ±0.1 mm.

The assembly means A of both parts 3a, 3b comprise at least one tapped hole 29 provided in part 3b and emerging, on the one hand, into the connection volume between the pressurised fluid inlet 25 and radial chamber 24 and, on the other hand, on to surface 28 of part 3b. This hole 29 is, preferably, coaxial with inlet 25.

A central boring 30 is provided in part 3a, so as to pass completely through this part and to be coaxial with the tapped hole 29 when the two parts are disposed one against the other. The lower zone 31 of this boring 30 is able to receive and to retain the head 32 of a screw whose threaded part 33 projects from face 27 so as to be able to cooperate with the tapped hole 29 and to ensure the fixing of part 3a on part 3b.

Zone 34 of boring 30 located on the other side of screw 32 has a diameter greater than that of part 31 and is tapped so as to enable a support to be screw-fixed for lever 5.

In the embodiment of the drawing, this support comprises ball joint 6 extended by a threaded shank 6a screwed into tapped zone 34.

A sealing joint 35 is disposed in the vicinity of the periphery of parts 3a,3b to prevent any leakage of liquid towards the outside.

This seal 35 is disposed in a groove 35a, provided for example in part 3a.

Likewise a seal 36, disposed in a groove 36a provided, for example, in part 3a, surrounds the threaded part 33 of the assembly screw so as to prevent leaks between the pressurised liquid inlet and the low-pressure zone. A seal 37 is also provided between the assembly screw and the wall of boring 30.

Duct 16, for connecting each housing 13 to the low-pressure zone, is advantageously formed by an annular recess provided in part 3a and emerging on to face 27 forming the surface of separation; the passage or duct 17 passes through part 3b so as to link up with this housing 16 when the two parts 3a,3b are assembled. Recess 16 is included, radially, between seals 35 and 36.

Passage 17 emerges through an aperture 38, connecting with the low pressure, on to face f of part 3b located on the side opposite the separation surface S. It is thus apparent that all the connection apertures are regrouped on the same face f of part 3b.

Part 3a comprises, on the side distant from separation surface S, a peripheral flange 39, projecting radially from the outer surface of part 3a and comprising holes 40 for fixing body 3.

The operation of such a distributing device is known and it is pointless dwelling thereon.

The manufacture of such a distributing device in conformity with the invention is facilitated, and the performance of this distributor can be improved as explained herebelow.

First of all, the machining of surfaces 18a, 18b and of groove 18c of bore 18 is delicate.

This machining is achieved by introducing a tool through the upper face of the manipulator, i.e. through the face located on the side opposite the face comprising the fluid inlet and outlet apertures 20, 26, 38. The tool used for machining these surfaces 18a, 18b, operates in cantilever fashion, which generates vibrations during the machining and causes a lowering of the machining accuracy.

Due to the fact that, according to the invention, body 3 is formed from two parts 3a, 3b, before assembly of these parts, access to bore 18, through face 28 of part 3b, is facilitated. Indeed, the distance between face 28 and surfaces 18a, 18b to be machined is considerably reduced in relation to distance D.

The machining of groove 18c is achieved by offsetting the tool which passes into bore 18. This is possible, according to the invention, owing to the much reduced cantilever.

In a one-piece body 3, the machining tool would have to be introduced through the upper face of body 3, which would result in a considerable cantilever.

According to the invention, owing to the reduction of the cantilever of the tool, it will be possible to operate with tools of smaller dimensions because of the smaller vibrations generated by the machining.

Therefore, according to the invention, it is possible to reduce the diameter of bore 18. This diameter can, for example, be reduced to a value of 6 mm; concurrently, the outer diameter of the active part 19 of the reducer is reduced, so that the forces due to the fluid pressure on plunger 12 will be reduced.

The result will be a smoother control for the operator because of the smaller stresses coming into play; furthermore, the calibrating means 14, formed essentially by helical springs, will be subjected to less severe conditions and their working life will be increased.

Part 3a of the manipulator body is not subjected to the pressurised fluid, so that this part can be formed from a material whose mechanical characteristics are inferior to those of the material used for part 3b which is subjected to the pressurised fluid.

Advantageously, part 3a can be formed from a light alloy permitting chillcast moulding, with great accuracy of execution, so that this part 3a may be obtained practically directly from moulding, without it being necessary to carry out extra machining, particularly at flange 39 and fixing holes 40.

For certain applications part 3a could even be made from a plastic material.

The other part 3b of body 3 is generally formed from cast-iron.

It is known that the moulding of cast-iron is often carried out on cores in sand; now, the hydraulic circuits in which distributors such as 1 are used, are very sensitive to foreign particles, particularly grains of sand, which can cause the deterioration of such hydraulic circuits.

It is then necessary, after moulding on cores in sand, to carry out a thorough de-sanding of the parts usable in a hydraulic circuit.

This problem is particularly delicate and the solution proposed by the invention is interesting since the cavities provided in part 3b, which will be formed from cast-iron, cavities such as 24, 25 and 17, have shapes permitting a complete de-sanding.

In fact, these cavities are easily accessible through the two transverse faces of part 3b. In particular, the tapped hole 29, belonging to the assembly means, enables an efficient de-sanding of the inner connection volume between inlet 25 and the radial chamber(s) 24 to be achieved.

It is to be noted moreover that, since part 3a is chill-cast, there is no risk of the presence of grains of sand in this part 3a.

I claim:

1. A fluid distributing device particularly for remote control comprising at least one calibration modifiable pressure reducer mounted in a body and a control member, such as a lever, capable of modifying the calibration of the reducer, which reducer comprises a plunger movable in a cavity of the body, this cavity comprising, on one side, a housing in which are placed the reducer calibrating means, this housing being connected to a low-pressure fluid zone and, on the other side, a bore in which an active part of the plunger can be moved, this active part controlling the pressure of the fluid at an outlet aperture located in the axial extension of the bore, said active part comprising a blind axial hole opening into the bore on the side of said aperture, and at least a transverse aperture provided, in the vicinity of the bottom of the blind hole, to communicate this hole with the outside surface of the active part, the transverse aperture being able to cooperate with a shoulder of the bore, which comprises, particularly, at the shoulder, precision machined surfaces for cooperating with the plunger, the part of the cavity of the distributor body located, with respect to this shoulder, on the side opposite the outlet aperture communicating with the low-pressure fluid zone, whereas the part of the bore located, with respect to the shoulder, on the side of the outlet aperture comprises a groove connected to a central pressurised fluid inlet, characterised by the fact that the body of the distributor is formed from two parts, independent of each other and connected by assembly means, these two parts being separated by a surface transversely directed in relation to the bore, this separation surface passing through the housing connected to the low-pressure zone and being located, in relation to said shoulder, on the side opposite the outlet aperture, said surface being, furthermore, located in the vicinity of one end of said bore so that before assembly of the two parts access to the bore is easy, particularly for machining operations on surfaces of this bore.

2. A device according to claim 1, characterised by the fact that the separation surface is flat and perpendicular to the axis of the bore so that the faces of both parts of the body coming into contact along the separation surface are also flat and perpendicular to the axis of the bore.

3. A device according to claim 1, characterised by the fact that the part of the distributor body containing the housing connected to the low-pressure zone is formed from a material whose mechanical characteristics are inferior to those of the material used for the part of the body comprising the bore connected to the low-pressure fluid zone.

4. A device according to claim 3, characterised by the fact that the body part containing the housing is made from a light alloy permitting high precision chill-cast moulding, the part comprising the bore connected to the low-pressure fluid zone being made from cast-iron.

5. A device according to claim 1 in which the distributor body comprises several cavities spread out around the axis of the distributor body, characterised by the fact that it comprises a pressurised fluid inlet provided in the body part, comprising bores, on the side of the face of this part opposite that forming the separation surface, radial chambers being provided for connecting the pressure inlet to the bores and at least one tapped hole, belonging to the assembly means of the two parts, which hole emerges, on the one hand, into the pressurised fluid chambers and, on the other hand, on to the face of the body part forming the separation surface in the assembled distributor.

6. A device according to claim 5, characterised by the fact that the tapped hole has its axis merging with that of the distributor body.

7. A device according to claim 6, characterised by the fact that the assembly means comprise, on the side of the part of the body comprising housings connected to the low-pressure zone, a screw whose head is retained in this other part of the body, this screw having a threaded part capable of cooperating with said tapped hole.

8. A device according to claim 7, characterised by the fact that the part of the body comprising the housings is provided with an axial boring in the bottom of which is placed the screw intended to cooperate with the tapped hole, the head of this screw being retained in the boring, the part of this boring, located beyond the head of the screw being tapped so as to permit a support to be fixed for the control member of the distributing device.

9. A device according to claim 1, characterised by the fact that the diameter of the active part of the plunger and of the conjugate surfaces of the bore of the distributor body is equal to 6 mm.

10. A device according to claim 1 characterized by the fact that all the fluid inlet and outlet apertures are regrouped on the face of the part of the body, comprising bores, opposite the face forming the separation surface; the aperture for connection with the low-pressure zone, also provided on this face, is connected by a passage passing through the part comprising the bores to the face forming the separation surface; a part of the body comprising housing, and an annular recess is provided in the part of the body comprising the housings to interconnect said housings, this annular recess emerging on to the face forming the surface of separation so as to be linked up with said passage when the two parts are assembled.

* * * * *